US012688968B2

(12) United States Patent
Marek et al.

(10) Patent No.: US 12,688,968 B2
(45) Date of Patent: Jul. 21, 2026

(54) COMPACT THIN-FILM SURFACE MOUNTABLE COUPLER

(71) Applicant: KYOCERA AVX Components Corporation, Fountain Inn, SC (US)

(72) Inventors: Michael Marek, Jerusalem (IL); Elinor O'Neill, Mevaseret Zion (IL); Arie Leonid Talalaevsky, Jerusalem (IL); Nahum Bohmstein, Modi-n-Maccabim-Re'ut (IL)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 1273 days.

(21) Appl. No.: 17/533,172

(22) Filed: Nov. 23, 2021

(65) Prior Publication Data

US 2022/0165491 A1 May 26, 2022

Related U.S. Application Data

(60) Provisional application No. 63/117,615, filed on Nov. 24, 2020.

(51) Int. Cl.
*H01F 38/14* (2006.01)
*H01F 19/04* (2006.01)
(Continued)

(52) U.S. Cl.
CPC ............. *H01F 38/14* (2013.01); *H01F 19/04* (2013.01); *H01F 27/292* (2013.01); *H01P 5/18* (2013.01);
(Continued)

(58) Field of Classification Search
CPC ...... H01F 38/14; H01F 27/2804; H01F 19/04; H01F 2027/2809; H01F 2038/143; H01F 2038/146; H01F 27/29; H01F 27/292; H01F 17/0006; H01F 27/28; H01F 41/042; H01P 5/185; H01P 5/18; H01P 5/184; H01P 5/12; H01P 5/187; H01P 11/00; H01P 5/10;
(Continued)

(56) References Cited

U.S. PATENT DOCUMENTS

| | | | |
|---|---|---|---|
| 6,600,386 | B1 | 7/2003 | Löbl et al. |
| 6,806,789 | B2 | 10/2004 | Bawell et al. |

(Continued)

OTHER PUBLICATIONS

Product Information for Xinger®—Ultra Low Profile 0805 20dB Directional Coupler, Model DC1722J5020AHF (Rev. C) from Anaren®, 7 pages.

(Continued)

*Primary Examiner* — John W Poos
(74) *Attorney, Agent, or Firm* — Dority & Manning, P.A.

(57) ABSTRACT

A surface mountable thin-film coupler may include a monolithic base substrate and a plurality of ports formed over the monolithic base substrate. The surface mountable thin-film coupler may include at least one thin-film component connected with at least one port of the plurality of ports. The surface mountable thin-film coupler may provide a coupling factor that is greater than −5 dB and less than −1 dB over a coupling frequency range having a lower bound that is greater than 1 GHz and an upper bound that is at least 200 MHz greater than the lower bound. A footprint of the coupler may be less than about 3 $mm^2$.

32 Claims, 10 Drawing Sheets

(51) Int. Cl.
*H01F 27/29* (2006.01)
*H01P 5/18* (2006.01)

(52) U.S. Cl.
CPC .. *H01F 2038/143* (2013.01); *H01F 2038/146* (2013.01)

(58) Field of Classification Search
CPC .... H01P 1/24; H01P 1/20; H01P 3/081; H01P 5/02; H01P 5/16; H01P 1/18; H01P 5/028; H01P 5/04; H01P 5/188; H01P 1/20345; H01P 1/2135; H01P 3/00; H01P 3/082; H01P 1/15; H01P 1/20363; H01P 1/205; H01P 1/208; H01P 1/30; H01P 1/32; H01P 1/36; H01P 1/38; H01P 3/06; H01P 3/088; H01P 3/12; H01P 5/085; H01P 5/107; H01P 5/181; H01P 5/227; H01P 1/195; H01P 1/203; H01P 1/20336; H01P 1/20381; H01P 3/087; H01P 7/00; H03H 9/6483; H03H 9/205; H03H 7/48; H03H 9/542; H03H 9/25; H03H 9/02559; H03H 9/54; H03H 7/38; H03H 9/02574; H03H 9/02834; H03H 9/14541; H03H 9/568; H03H 9/605; H03H 9/72; H03H 3/02; H03H 7/0115; H03H 7/09; H03H 9/6436; H03H 9/725; H03H 9/02031; H03H 9/6496; H03H 2210/025; H03H 9/02228; H03H 9/545; H03H 9/6409; H03H 7/0153; H03H 7/463; H03H 9/13; H03H 9/6433; H03H 2007/013; H03H 3/08; H03H 7/004; H03H 7/0138; H03H 7/075; H03H 7/20; H03H 9/02637; H03H 9/14547; H03H 9/6456; H03H 11/12; H03H 11/1291; H03H 11/16; H03H 2210/012; H03H 2210/015; H03H 2210/017; H03H 2210/021; H03H 3/013; H03H 7/06; H03H 7/1758; H03H 7/1766; H03H 7/1775; H03H 7/21; H03H 7/465; H03H 7/468; H03H 9/02866; H03H 9/02992; H03H 9/1014; H03H 9/14544; H03H 9/14555; H03H 9/14591; H03H 9/14597; H03H 9/2463; H03H 9/547; H03H 9/564; H03H 9/64; H03H 9/6403; H03H 9/6426; H03H 9/6459; H03H 9/6476; H03H 11/30; H03H 2003/0407; H03H 2007/386; H03H 2009/02496; H03H 2009/02511; H03H 2009/02519; H03H 2009/02527; H03H 3/10; H03H 7/40; H03H 9/02015; H03H 9/02118; H03H 9/02157; H03H 9/02244; H03H 9/02566; H03H 9/02669; H03H 9/02858; H03H 9/131; H03H 9/2457; H03H 9/583; H03H 9/60; H03H 9/6489; H03H 9/703; H03H 9/706; H03H 9/74; H03H 2003/023; H03H 2003/027; H03H 2003/0414; H03H 2009/02181; H03H 2009/02307; H03H 2009/155; H03H 3/0077; H03H 3/04; H03H 7/52; H03H 9/02; H03H 9/02047; H03H 9/02086; H03H 9/02102; H03H 9/02141; H03H 9/02259; H03H 9/02362; H03H 9/02401; H03H 9/02448; H03H 9/02582; H03H 9/02685; H03H 9/02818; H03H 9/02897; H03H 9/02921; H03H 9/02984; H03H 9/105; H03H 9/1057; H03H 9/125; H03H 9/132; H03H 9/145; H03H 9/14564; H03H 9/1457; H03H 9/14582; H03H 9/17; H03H 9/172; H03H 9/173; H03H 9/175; H03H 9/2452; H03H 9/56; H03H 9/566; H03H 9/643; H03H 9/6463; H03H 2003/021

See application file for complete search history.

(56) References Cited

U.S. PATENT DOCUMENTS

| | | | | |
|---|---|---|---|---|
| 6,890,629 | B2 | 5/2005 | Casper et al. | |
| 7,218,186 | B2 | 5/2007 | Chen | |
| 7,305,223 | B2 * | 12/2007 | Liu | H01L 23/5227 257/532 |
| 7,477,114 | B2 | 1/2009 | Pivit et al. | |
| 7,838,964 | B2 | 11/2010 | Carobolante et al. | |
| 8,111,113 | B2 | 2/2012 | Liu et al. | |
| 8,928,428 | B2 | 1/2015 | Gorbachov | |
| 9,000,864 | B2 | 4/2015 | Tanaka | |
| 12,183,758 | B2 | 12/2024 | Miyamoto | |
| 2011/0057742 | A1 * | 3/2011 | Frye | H05K 1/0239 333/175 |
| 2018/0158786 | A1 * | 6/2018 | Staudinger | H10D 1/20 |
| 2020/0295432 | A1 * | 9/2020 | Marek | H05K 1/165 |

OTHER PUBLICATIONS

Product Information for Xinger®IV—Directional Coupler 30dB, Model X4C30F1-30S (Rev. D) from Anaren®, 18 pages.

Product Information for Xinger®—Ultra Low Profile 0805 20dB Directional Coupler, Model DC2337J5020AHF (Rev. E) from Anaren®, 7 pages.

Product Information for Multilayer Directional Coupler for 2400-2500MHz / 4900-5850MHz, HHM 2510B1 from TDK dated Apr. 2015, 7 pages.

Production Information for 20 to 40GHz 10dB Directional Coupler, FPC07182-Preliminary, from Dielectric Laboratories and Knowles dated May 2015, 2 pages.

Production Information for DC to 40GHz 20db, Resistive Coupler, from Dielectric Laboratories and Knowles dated Mar. 2017, 2 pages.

International Search Report and Written Opinion for PCT/US2021/060454 dated Mar. 21, 2022, 11 pages.

* cited by examiner

*FIG. −6−*

COMPACT THIN-FILM SURFACE MOUNTABLE COUPLER

CROSS REFERENCE TO RELATED APPLICATION

The present application claims filing benefit of U.S. Provisional Patent Application Ser. No. 63/117,615 having a filing date of Nov. 24, 2020, which is incorporated herein by reference in its entirety.

BACKGROUND OF THE INVENTION

Couplers generally couple a source line with a coupled line without direct electrical contact and duplicate an electrical signal from the source line to the coupled line. A trend towards miniaturization has increased the desirability of small, passive couplers. Miniaturization, however, has increased the difficulty of surface mounting such small couplers. Thus, a compact surface mountable thin-film coupler would be welcomed in the art.

SUMMARY

In accordance with one embodiment of the present invention, a surface mountable thin-film coupler may include a monolithic base substrate and a plurality of ports formed over the monolithic base substrate. The surface mountable thin-film coupler may include at least one thin-film component connected with at least one port of the plurality of ports. The surface mountable thin-film coupler may provide a coupling factor that is greater than −5 dB over a coupling frequency range having a lower bound that is greater than 1 GHz and an upper bound that is at least 200 MHz greater than the lower bound. A footprint of the coupler may be less than about 3 $mm^2$.

In accordance with another embodiment of the present invention, a surface mountable thin-film coupler may include a monolithic base substrate and a plurality of ports formed over the monolithic base substrate. The plurality of ports may include an isolated port, a coupling port, an input port, and an output port. A first thin-film inductor may be connected between the input port and the output port. A second thin-film inductor may be connected between the coupling port and the isolated port and inductively coupled with the first thin-film inductor. A footprint of the coupler may be less than about 3 $mm^2$.

In accordance with another embodiment of the present invention, a method for forming a surface mountable thin-film coupler may include providing a monolithic base substrate and forming a plurality of ports over the monolithic base substrate. The plurality of ports may include an isolated port, a coupling port, an input port, and an output port. The method may include forming a first thin-film inductor connected between the input port and the output port. The method may include forming a second thin-film inductor connected between the coupling port and the isolated port and inductively coupled with the first thin-film inductor. A footprint of the coupler may be less than about 3 $mm^2$.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Figure 1:
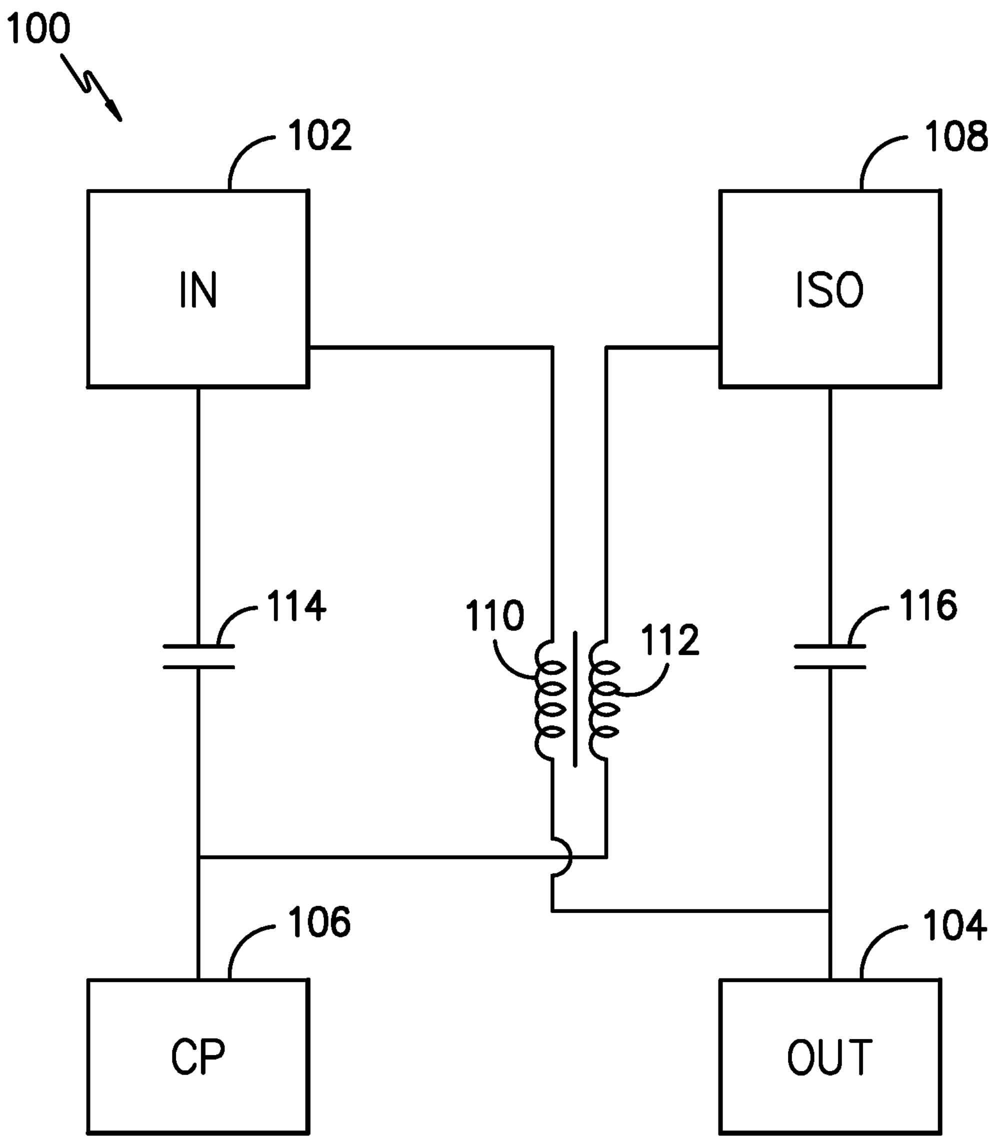
FIG. 1 illustrates a schematic view of a compact thin-film surface mountable coupler in accordance with aspects of the present disclosure.

Repeat use of reference characters throughout the present specification and appended drawings is intended to represent same or analogous features or elements of the invention.

DETAILED DESCRIPTION OF REPRESENTATIVE EMBODIMENTS

A surface mount, thin-film coupler is provided that provides even coupling for high frequencies in a compact surface-mountable package. Couplers generally reproduce a coupled signal in a coupled port in response to an input signal being applied to an input port of the coupler. In some embodiments, the coupler can be configured as a 3 dB splitter/combiner. A 3 dB splitter/combiner can split the input signal approximately evenly between the coupled port and an output port. The input signal can be reproduced in each of the coupled line and output line at half of the amplitude as the input signal. Similarly, the 3 dB splitter/combiner can combine a first signal applied to the input port and a second signal applied to the coupled port to produce a combined signal at the output port. Such 3 dB splitter/combiners have a variety of uses including power supplies, for example as described below with reference to FIG. 8.

Generally, the presently disclosed thin-film coupler provides excellent performance characteristics in a very compact surface mountable package. As such, the thin-film coupler can require a small amount of space (e.g., a small footprint) when mounted to a surface, such as a printed circuit board. Such compact size can be especially useful as devices that employ surface mount technology, such as power supplies, become smaller.

For example, the coupler may have a small footprint and thus require less space for mounting on a printed circuit board. The coupler may have a footprint of less than about 3 $mm^2$, in some embodiments less than about 2.5 $mm^2$, in some embodiments less than about 2.0 $mm^2$, in some embodiments less than about 1.5 $mm^2$, in some embodiments less than about 1.0 $mm^2$, in some embodiments less than about 0.8 $mm^2$, and in some embodiments less than about 0.6 $mm^2$.

The coupler may have a length that is less than about 2.0 mm, in some embodiments less than about 1.8 mm, in some embodiments less than about 1.5 mm, and in some embodiments less than about 1.1 mm. A width of the coupler may be less than about 1.2 mm, in some embodiments less than about 1 mm, in some embodiments less than about 0.8 mm, in some embodiments less than about 0.7 mm, and in some embodiments less than about 0.6 mm. In some embodiments, the thin-film coupler may have an EIA case size of 1206, 0805, 0504, 0402, 0303, 0202, or smaller.

The coupler may generally include a monolithic base substrate. At least one port (e.g., an input port, output port, a coupling port, and/or an isolated port) may be exposed along an exterior of the coupler for surface mounting the coupler, for example using grid array-type mounting (e.g., land grid array (LGA) type mounting, ball grid array (BGA) type, etc.). The coupler may include a monolithic base substrate and a plurality of ports formed over the monolithic base substrate. At least one thin-film component may be connected with at least one port of the plurality of ports. The surface mountable thin-film coupler can provide a coupling factor that is greater than −5 dB over a coupling frequency range having a lower bound that is greater than 1 GHz and an upper bound that is at least 200 MHz greater than the lower bound. For example, the lower bound of the coupling frequency range can range from about 1 GHz to about 8 GHz, in some embodiments from about 1.5 GHz to about 6 GHz, and in some embodiments from about 2 GHz to about 4 GHz. The upper bound can be 200 MHz or more greater than the lower bound, in some embodiments 300 MHz or more greater than the lower bound, in some embodiments 500 MHz or more greater than the lower bound, in some embodiments 800 MHz or more greater than the lower bound, in some embodiments 1 GHz or more greater than the lower bound, and in some embodiments 2 GHz or more greater than the lower bound.

In some embodiments, the coupler can exhibit a coupling factor that is greater than −5 dB and less than −1 dB across the coupling frequency range. For example, as indicated above, in some embodiments the coupler may be a 3 dB coupler. In such embodiments, the coupler can exhibit a coupling factor of about −3 dB. For example, the coupler can exhibit a coupling factor that is between −2 dB and −4 dB, and in some embodiments between −2.5 dB and −3.5 dB. As another example, the coupling frequency range may extend from about 2 GHz to about 3 GHz, in some embodiments, from about 2 GHz to about 4 GHz, and in some embodiments from about 3 GHz to about 4.5 GHz.

The coupler can provide consistent coupling across the coupling frequency range. For example, the coupler can exhibit a coupling factor that varies less than 5 dB over the coupling frequency range, in some embodiments less than 4.5 dB, and in some embodiments less than 4 dB, in some embodiments less than 3.5 dB, and in some embodiments less than 3 dB. The coupling factor can vary less than 5 dB per GHz, in some embodiments less than 3 dB per GHz, in some embodiments less than 2 dB per GHz, in some embodiments less than 1.5 dB per GHz, and in some embodiments less than 1.2 dB per GHz.

The coupler can exhibit an isolation factor that is less than about −10 dB across the coupling frequency range, in some embodiments less than about −12 dB across the coupling frequency range, in some embodiments less than about −14 dB, in some embodiments less than about −16 dB, and in some embodiments less than about −17 dB. A low isolation factor across the coupling frequency range indicates excellent directivity. In contrast, a high isolation factor (e.g., an isolation factor of greater than −10 dB) would indicate a lossy coupler.

The coupler may include one or more thin-film components configured to produce a coupled signal in the coupling port (e.g., with respect to the isolated port) in response to an input signal received by the input port. For example, the coupler may include a first thin-film inductor connected between the input port and the output port. The coupler may include a second thin-film inductor connected between the coupling port and the isolated port and inductively coupled with the first thin-film inductor.

In some embodiments, the coupler may include one or more thin-film capacitors. For example, a first thin-film capacitor may be connected between the input port and the coupling port. A second thin-film capacitor may be connected between the isolated port and the output port.

The coupler may include a monolithic base substrate. A plurality of layers may be formed over the monolithic base substrate. The plurality of layers may include dielectric materials and/or protective materials. The coupler may include patterned conductive layers including thin-film components formed on and/or between the various layers. In some embodiments, a cover layer may be formed over the layers. The cover layer may include a variety of suitable materials, such as silicon oxynitride. In some embodiments, a first protective layer may be formed over the cover layer. The first protective layer may include a variety of suitable materials, such as polyimide.

The ports may extend through the layers (and first protective layer if present) and may electrically connect with a first patterned conductive layer (e.g., adjacent the monolithic substrate), a second patterned conductive layer, and/or a third patterned conductive layer. The ports may protrude beyond an outer surface of the cover layer such that the coupler may be mounted and electrically connected (e.g., to a printed circuit) via the ports (e.g., as a “flip chip”). The ports may be formed by selective etching followed by deposition of a conductive material (e.g., copper), for example using electroplating. The ports may include one or more layers over the conductive material, such as plating of tin, nickel, or a mixture thereof.

As used herein, a first layer that is “formed over” a second layer may refer to the first layer being arranged over the second layer with respect to a thickness direction of the coupler. The first layer may be directly in contact with the second layer. However, intermediate layers may also be formed therebetween such that the first layer and second layer do not directly contact each other.

The cover layer may include a suitable ceramic dielectric material, for example as described below. The cover layer may have a thickness that ranges from about 100 microns to about 600 microns, in some embodiments from about 125 microns to about 500 microns, in some embodiments from about 150 microns to about 400 microns, and in some embodiments from about 175 microns to about 300 microns.

The base substrate, dielectric layer, and/or cover layer may comprise one or more suitable ceramic materials. Suitable materials are generally electrically insulating and thermally conductive. Example dielectric materials include, hafnium dioxide ($HFO_2$), aluminum oxide ($AL_2O_3$) tantalum pentoxide ($Ta_2O_5$), silicon oxynitride, silicon nitride, silicon oxide, and organic materials, such as silk. In alternative embodiments, one or more of the following dielectric materials may be employed: barium titanate, strontium titanate, strontium barium titanate, bismuth strontium tantalate, niobium, oxides or nitrides or such materials, NPO (COG), X7R, X7S, Z5U, Y5V formulations, lead-based materials such as doped or non-doped PZT dielectrics, and others.

The base substrate and/or cover layer can include glass, ceramic, organic materials, or a mixture thereof. Additional example materials for the base substrate and/or cover layer include alumina, aluminum nitride, beryllium oxide, aluminum oxide, boron nitride, silicon, silicon carbide, silica, gallium arsenide, gallium nitride, zirconium dioxide, mixtures thereof, oxides and/or nitrides of such materials, or any other suitable ceramic material. Additional ceramic materials include calcium titanate ($CaTiO_3$), zinc oxide (ZnO), ceramics containing low-fire glass, and other glass-bonded materials.

In some embodiments, one or more of the base substrate, dielectric layer, and/or cover layer may include sapphire or ruby. Sapphire and ruby are types of corundum, which is a crystalline form of aluminum oxide (a ceramic material) containing additional trace materials. A substrate comprising sapphire may provide several benefits including excellent electrical insulation, heat dissipation, and high temperature stability. Additionally, because sapphire is generally transparent, internal features of the coupler may be visually inspected, reducing the time and difficulty associated with checking completed components for quality.

The base substrate, dielectric layer, and/or cover layer may include a material having a dielectric constant that is less than about 30 as determined in accordance with ASTM D2149-13 at an operating temperature of 25° C. and frequency of 1 kHz, in some embodiments less than about 25, in some embodiments less than about 20, and in some embodiments less than about 15. However, in other embodiments, a material having a dielectric constant higher than 30 may be used to achieve higher frequencies and/or smaller components. For example, in such embodiments, the dielectric constant may range from about 30 to about 120, or greater, as determined in accordance with ASTM D2149-13 at an operating temperature of 25° C. and frequency of 1 kHz, in some embodiments from about 50 to about 100, and in some embodiments from about 70 to about 90.

The thin-film components may be formed of a variety of suitable materials. The thin-film inductors and/or capacitors may include conductive layers. The conductive layers may include a variety of suitable conductive materials. Example conductive materials include copper, nickel, gold, tin, lead, palladium, silver, and alloys thereof. Any conductive metallic or non-metallic material that is suitable for thin-film fabrication may be used, however. In some embodiments, the coupler may include a thin-film resistor. The thin-film resistor may include a resistive layer, which may be formed from a variety of suitable resistive materials. For example, the resistive layer may include tantalum nitride (TaN), nickel chromium (NiCr), tantalum aluminide, chromium silicon, titanium nitride, titanium tungsten, tantalum tungsten, oxides and/or nitrides of such materials, and/or any other suitable thin-film resistive materials.

The layers of thin-film component(s) may have thicknesses that are about 50 micrometers or less, in some embodiments 20 micrometers or less, in some embodiments 10 micrometers or less, and in some embodiments 5 micrometers or less. For example, in some embodiments the thickness of the thin-film components may range from about 0.05 micrometers to about 50 micrometers, in some embodiments from about 0.1 micrometers to about 20 micrometers, in some embodiments from about 0.3 micrometer to about 10 micrometers, in some embodiments from about 1 micrometer to about 5 micrometers.

The thin-film components may be precisely formed using a variety of suitable subtractive, semi-additive, or fully additive processes. For example, physical vapor deposition and/or chemical deposition may be used. For instance, in some embodiments, the thin-film components may be formed using sputtering, a type of physical vapor deposition. A variety of other suitable processes may be used, however, including plasma-enhanced chemical vapor deposition (PECVD), electroless plating, and electroplating, for example. Lithography masks and etching may be used to produce the desired shape of the thin-film components. A variety of suitable etching techniques may be used including dry etching using a plasma of a reactive or non-reactive gas (e.g., argon, nitrogen, oxygen, chlorine, boron trichloride) and/or wet etching.

In some embodiments, the coupler may include at least one adhesion layer in contact with one or more of the thin-film components. The adhesion layer may be or include a variety of materials that are suitable for improving adhesion between the thin-film components and adjacent layers, such as the base substrate, dielectric layer, and/or cover layer. As examples, the adhesion layer may include at least one of Ta, Cr, TaN, TiW, Ti, or TiN. For instance, the adhesive layer may be or include tantalum (Ta) (e.g., tantalum or an oxide or nitride thereof) and may be formed between the microstrips and the base substrate to improve adhesion therebetween. Without being bound by theory, the material of the adhesion layer may be selected to overcome phenomena such as lattice mismatch and residual stresses.

The adhesion layer(s) may have a variety of suitable thicknesses. For example, in some embodiments, the thicknesses of the adhesion layer(s) may range from about 100 angstroms to about 1000 angstroms, in some embodiments from about 200 angstroms to about 800 angstroms, in some embodiments from about 400 angstroms to about 600 angstroms.

As indicated above, the coupler may be configured for surface mounting to a mounting surface, such as a printed circuit board (PCB), using the port(s) exposed along the bottom surface of the coupler for surface mounting the component. For example, the coupler may be configured for grid array-type surface mounting, such as land grid array (LGA) type mounting, ball grid array (BGA) type mounting, or any other suitable type of grid array-type surface mounting. As such, the port(s) may not extend along side surfaces of the base substrate, for example as with a surface mount device (SMD). As such, in some embodiments side surfaces of the base substrate and/or coupler may be free of conductive material.

In some embodiments, the coupler may include a first protective layer exposed along a bottom surface of the coupler and/or a second protective layer exposed along a top surface of the coupler. For example, the first protective layer may be formed over the cover layer. In some embodiments, the second protective layer may be formed over the second surface of the monolithic base substrate. The first protective layer and/or second protective layer may include a layer of a polymeric material (e.g., polyimide), SiNO, $Al_2O_3$, $SiO_2$, $Si_3N_4$, benzocyclobutene, or glass. The first protective layer and/or second protective layer may have thicknesses that range from about 1 micron to about 300 microns, in some embodiments from about 5 microns to about 200 microns, and in some embodiments from about 10 microns to about 100 microns.

I. Example Embodiments

FIG. 1 illustrates a schematic view of a coupler 100 in accordance with aspects of the present disclosure. The coupler 100 may include an input port 102, output port 104, coupling port 106, and isolated port 108. A first inductor 110 may be inductively coupled with a second inductor 112. The first inductor 110 may be connected between the input port 102 and the output port 104. The second thin-film inductor 112 may be connected between the coupling port 106 and the isolated port 108.

In some embodiments, a first thin-film capacitor 114 may be connected between the input port 102 and the coupling port 106. A second thin-film capacitor 116 may be connected between the isolated port 108 and the output port 104.

Alternative configurations can be employed within the scope of this disclosure, however. For example, one or more capacitor 114, 116 may be omitted. Additional capacitors, inductors, and/or resistors may be employed to provide desired performance characteristics. One of ordinary skill in the art would understand that a variety of configurations are possible within the scope of the present disclosure.

Figure 2:
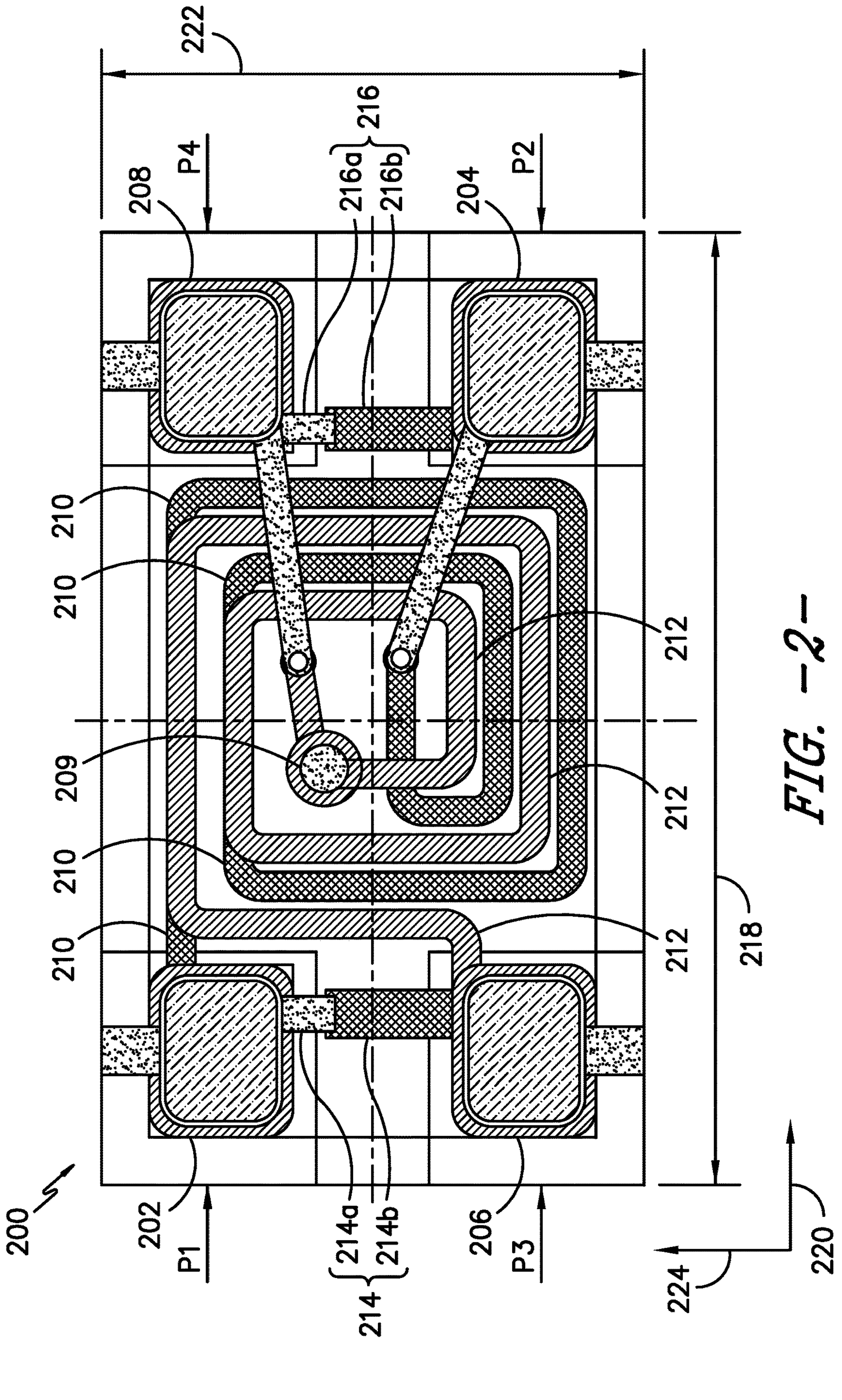
FIG. 2 illustrates a top down view of an embodiment of a coupler according to aspects of the present disclosure.

FIG. 2 illustrates a top down view of an embodiment of a coupler 200 according to aspects of the present disclosure. The coupler 200 may include a plurality of ports, including, for example, an input port 202, an output port 204, a coupling port 206, and/or an isolated port 208. A first thin-film inductor 210 may be inductively coupled with a second thin-film inductor 212. The first inductor 210 may be connected between the input port 202 and the output port 204. For example, the first thin-film inductor 210 can include a patterned conductive line separated from a patterned conductive line of the second thin-film inductor 212 in a thickness direction of the coupler 200, for example as described below with reference to FIGS. 4A through 4C. The second thin-film inductor 212 may be connected between the coupling port 206 and the isolated port 208, for example by one or more vias 209. The second thin-film inductor 212 can include a patterned conductive line separated from a patterned conductive line of the first thin-film inductor 210 in a thickness direction of the coupler 200 (e.g., by the second layer 244 shown in FIG. 3).

In some embodiments, a first thin-film capacitor 214 may be connected between the input port 202 and the coupling port 206. The first thin-film capacitor 214 may be formed from a first portion 214*a* and a second portion 214*b*. The first portion 214*a* may be formed by a first patterned conductive line on one layer of the coupler 200, and the second portion 214*b* may be formed by a second patterned conductive line on another layer separated from the layer having the first portion 214*a* in the thickness direction of the coupler 200. A second thin-film capacitor 216 may be connected between the isolated port 208 and the output port 204. The second thin-film capacitor 216 may be formed from a first portion 216*a* and a second portion 216*b*. The first portion 216*a* may be formed by a first patterned conductive line on one layer of the coupler 200, and the second portion 216*b* may be formed by a second patterned conductive line on another layer separated from the layer having the first portion 216*a* in the thickness direction of the coupler 200.

The coupler 200 may have a length 218 in a longitudinal direction 220 and a width 222 in a lateral direction 224. As indicated above the coupler 200 may have a small footprint (e.g., less than about 3 $mm^2$), which can be defined as an area of the coupler 200 equal to the length 218 multiplied by the width 222 of the coupler, thus require less space for mounting on a printed circuit board.

It will be understood that the differences in shading between different elements—such as the stippled shading of the first portion 214*a* of the first thin-film capacitor 214 and the first portion 216*a* of the second thin-film capacitor 216, the lattice shading of the first thin-film inductor 210, and the cross-hatched shading of the second thin-film inductor 212—are only for purposes of reviewing the figures, such as to differentiate between different elements in FIG. 2. Further, FIG. 2 illustrates the position or layout of various elements of the coupler 200—such as the ports 202, 204, 206, 208, the first inductor 210, the second inductor 212, the first capacitor 214, the second capacitor 212, etc. —with respect to one another in at least some embodiments of the coupler 200, and FIG. 2 does not necessarily represent the relative positions of the various patterned conductive lines, e.g., in the thickness direction.

Figure 3:
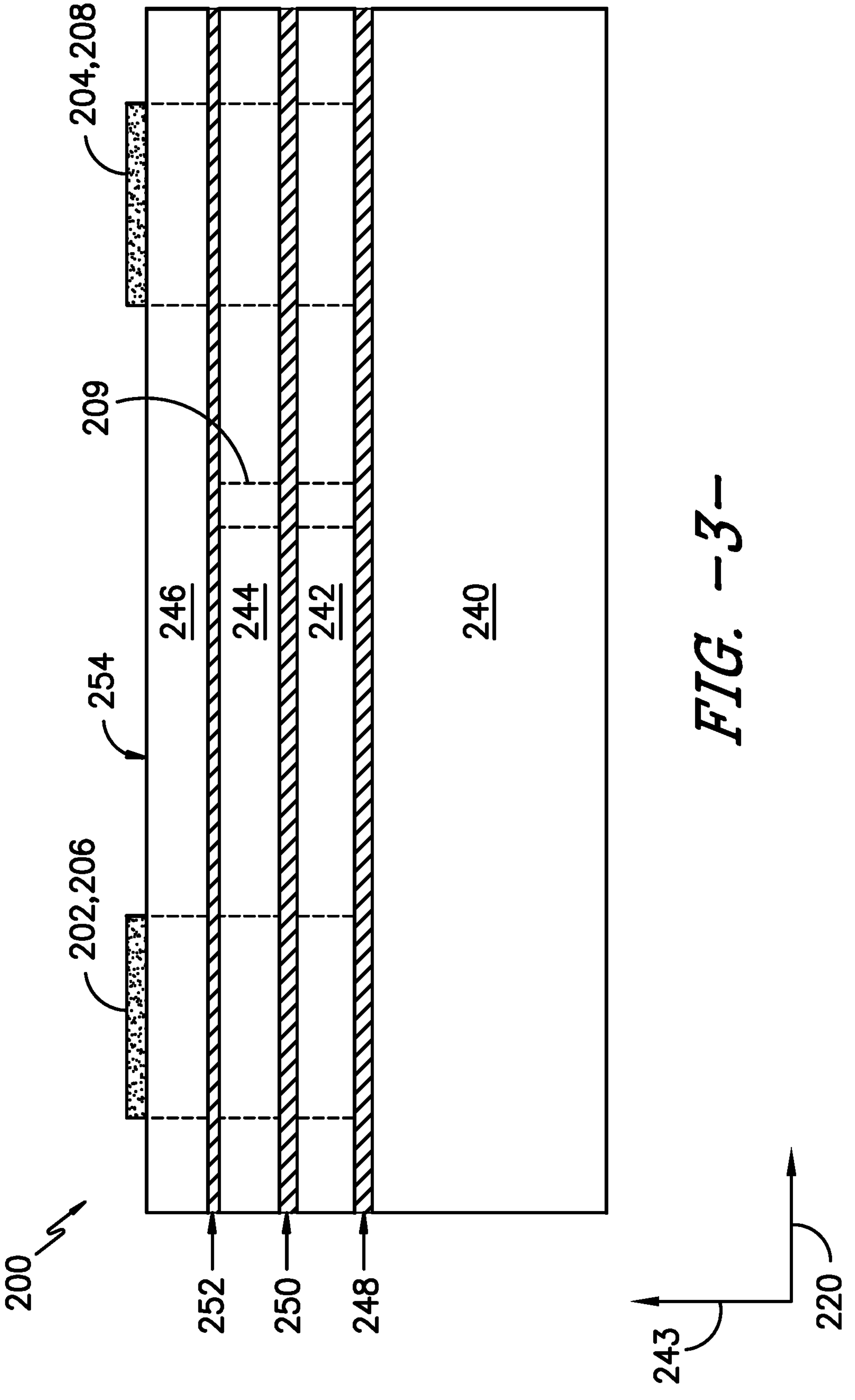
FIG. 3 is a side elevation view of the coupler of FIG. 2.

Referring to FIG. 3, the coupler 200 may include a monolithic base substrate 240. A first layer 242 may be formed over the monolithic base substrate 240 with respect to a thickness direction 243 of the coupler 200. A second layer 244 may be formed over the first layer 242. A cover layer 246 may be formed over the second layer 244. A first pattered conductive layer 248 may be formed over the monolithic base substrate 240. A second patterned conductive layer 250 may be formed over the first layer 242. A third patterned conductive layer 252 may be formed over the second layer 244. One or more protective layers may be formed over one or more of the patterned conductive layers 248, 250, 252, and/or over the first layer 242, second layer 244, and/or third layer 246. For example, a protective layer may be formed between the second patterned conductive layer 248 and first layer 242. The protective layer(s) may include a polymeric material, such as polyimide.

One or more vias 209 may be formed through one or more of the layers 242, 244. The cover layer 246 may include a variety of suitable materials, such as silicon oxynitride. In some embodiments, a first protective layer may be formed over the cover layer 246. The first protective layer may include a variety of suitable materials, such as polyimide.

Figure 4A:
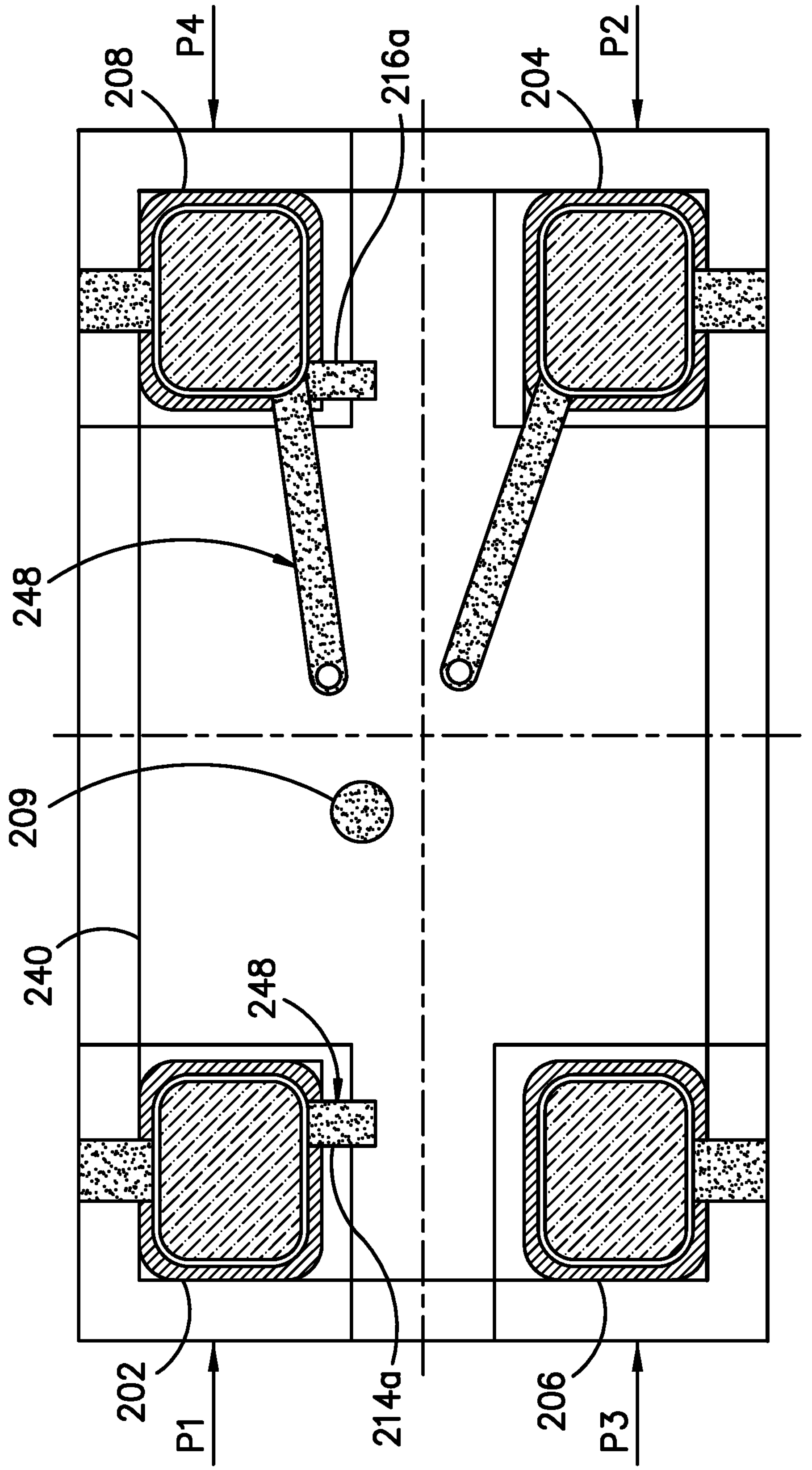
FIG. 4A illustrates an example first patterned conductive layer, which can be formed over a monolithic substrate of a compact thin-film surface mountable coupler in accordance with aspects of the present disclosure.
Figure 4B:
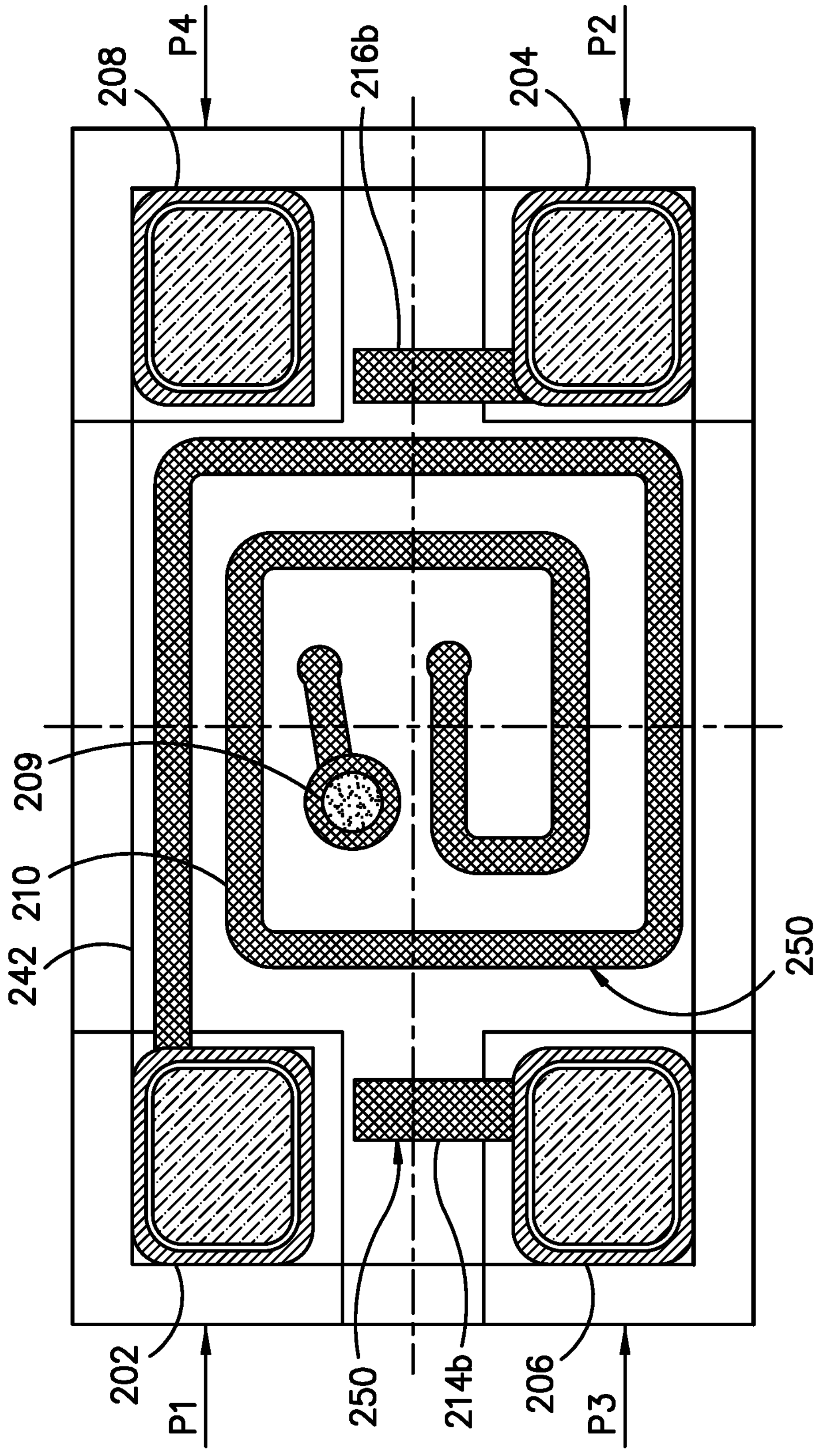
FIG. 4B illustrates an example second patterned conductive layer, which can be formed over the first layer of FIG. 4A in accordance with aspects of the present disclosure.
Figure 4C:
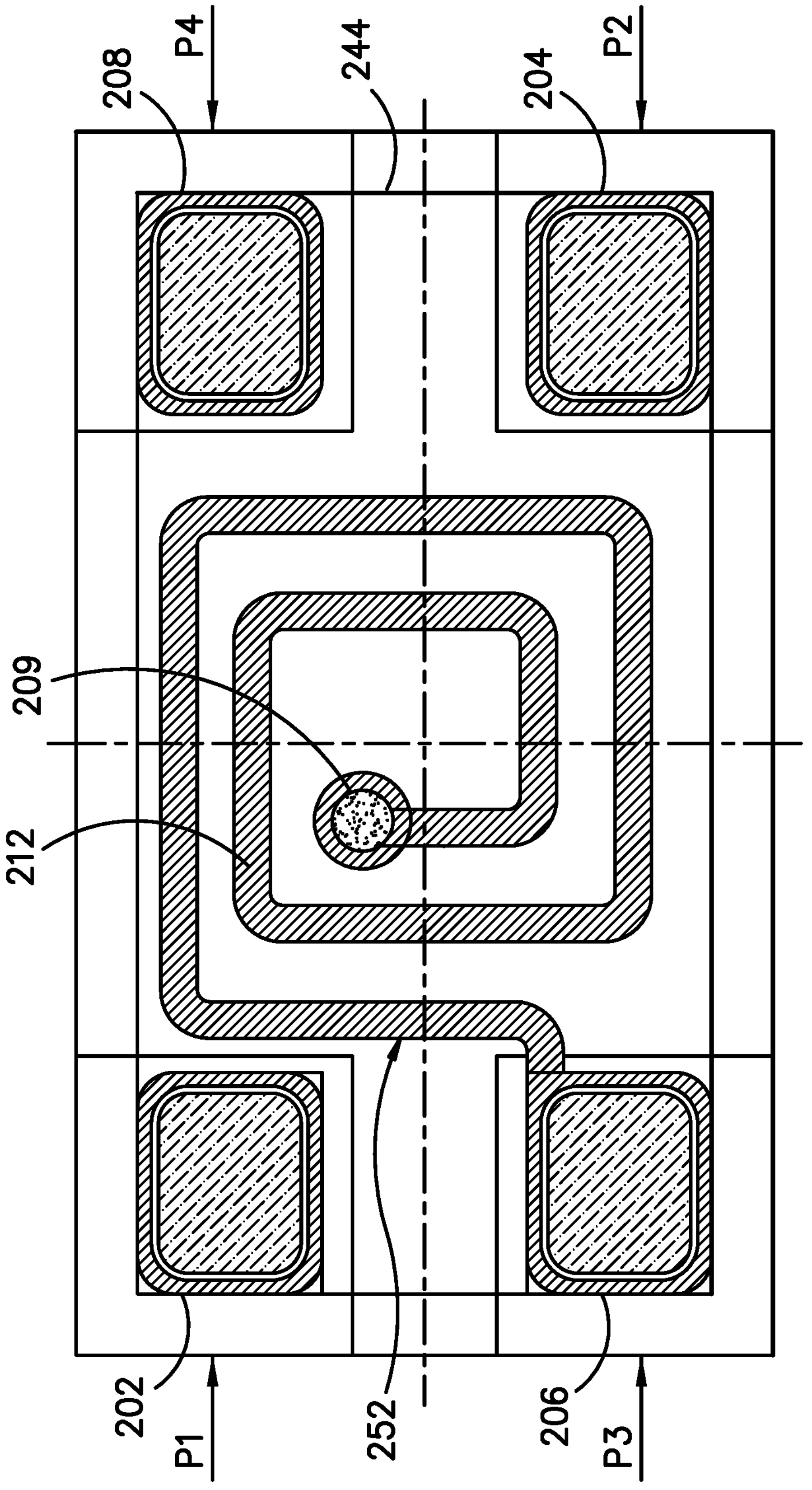
FIG. 4C illustrates an example second patterned conductive layer, which can be formed over the second layer of FIG. 4B in accordance with aspects of the present disclosure.

Referring to FIG. 3, the ports 202, 204, 206, 208 may extend through the layers 242, 244, 246 (and first protective layer, if present) and may electrically connect with the first patterned conductive layer 248, second patterned conductive layer 250, and/or the third patterned conductive layer 252, for example as described and illustrated with respect to FIGS. 4A through 4C.

The ports 202, 204, 206, 208 may protrude beyond an outer surface 254 of the cover layer 246 such that the coupler 200 may be mounted and electrically connected (e.g., to a printed circuit) via the ports 202, 204, 206, 208. The ports 202, 204, 206, 208, may be formed by selectively etching followed by deposition of a conductive material (e.g., copper), for example using electroplating. The ports 202, 204, 206, 208 may include one or more layers over the conductive material, such as plating of tin, nickel, or a mixture thereof.

FIGS. 4A through 4C illustrate example conductive patterns according to aspects of the present disclosure. FIG. 4A illustrates an example first patterned conductive layer 248 which can be formed over the monolithic substrate 240. FIG. 4B illustrates an example second patterned conductive layer 250, which can be formed over the first layer 242. FIG. 4C illustrates an example third patterned conductive layer 252, which can be formed over the second layer 244.

Figure 5:
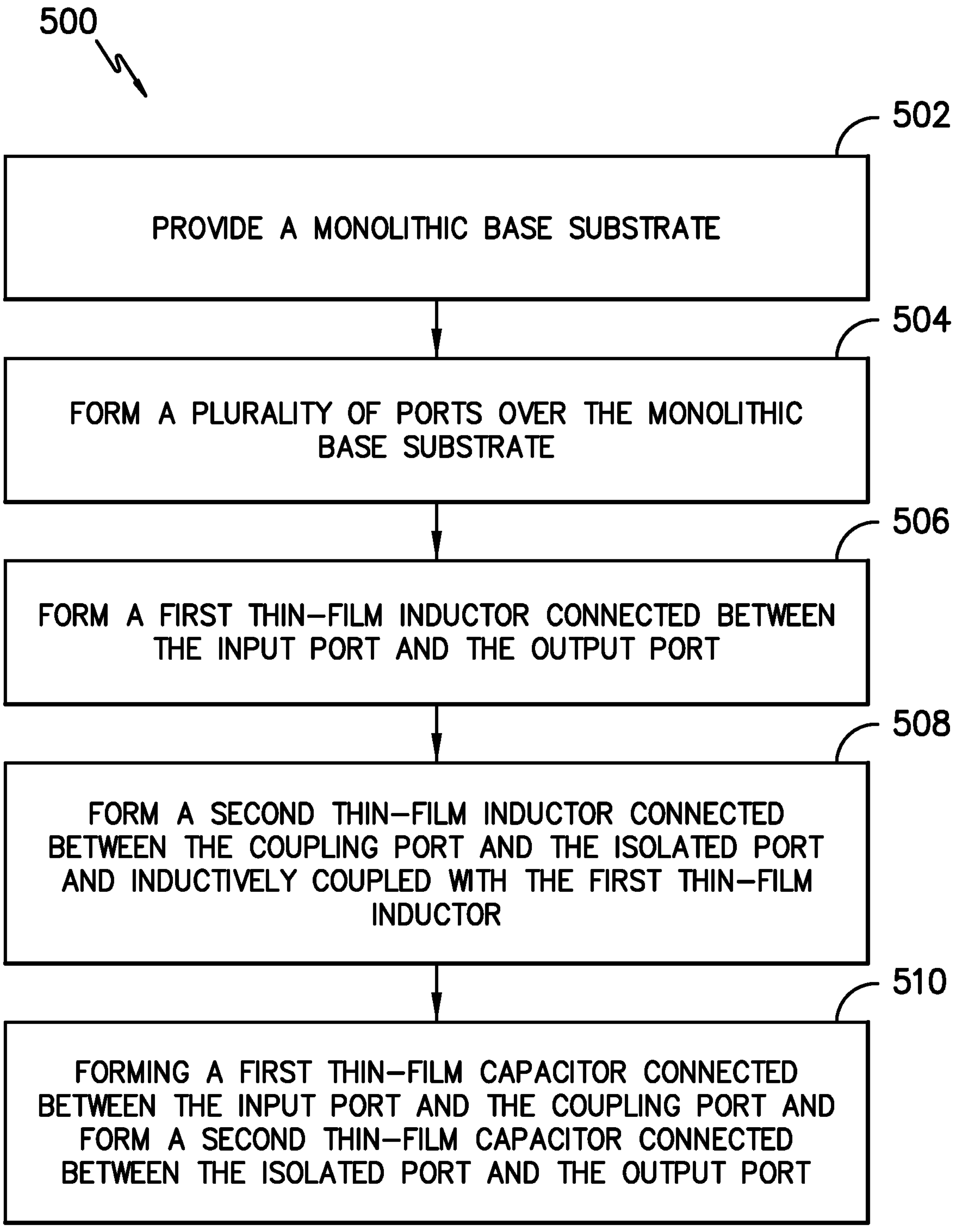
FIG. 5 is a flowchart of a method for forming a surface mountable coupler according to aspects of the present disclosure.

Referring to FIG. 5, aspects of the present disclosure are directed to a method 500 for forming a surface mountable coupler. In general, the method 500 will be described herein with reference to the thin-film coupler 200 described above with reference to FIGS. 1-4C. However, it should be appreciated that the disclosed method 500 may be implemented with any suitable thin-film coupler. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 500 may include, at (502), providing a monolithic base substrate. The monolithic base substrate may be or include a variety of material described herein, such as one or more suitable ceramic materials, sapphire, or ruby.

The method 500 may include, at (504), forming a plurality of ports over the monolithic base substrate. The plurality of ports can include an isolated port, a coupling port, an input port, and an output port, for example as described above with reference to FIGS. 1 through 4C. A series of layers can be deposited on the monolithic base substrate. Openings or windows can be formed in the series of layers through which the ports can be formed or deposited.

The method 500 may include, at (506), forming a first thin-film inductor connected between the input port and the output port. The method 500 may include, at (508), forming a second thin-film inductor connected between the coupling port and the isolated port and inductively coupled with the first thin-film inductor. For example, the first thin-film inductor can include forming patterned conductive lines separated in the thickness direction of the coupler from a patterned conductive line of the second thin-film conductor, for example as described above with reference to FIGS. 2 through 4C. For instance, forming the first thin-film inductor can include depositing and patterning a conductive layer (e.g., the second patterned conductive layer 250 over the first layer 242). Forming the second thin-film inductor can include depositing and patterning a conductive layer (e.g., the third patterned conductive layer 252 over the second layer 244).

In some embodiments, the method 500 may include, at (510), forming a first thin-film capacitor connected between the input port and the coupling port and forming a second thin-film capacitor connected between the isolated port and the output port, for example as described above with respect to FIGS. 1 through 4C.

II. Simulation Data

Figure 6:
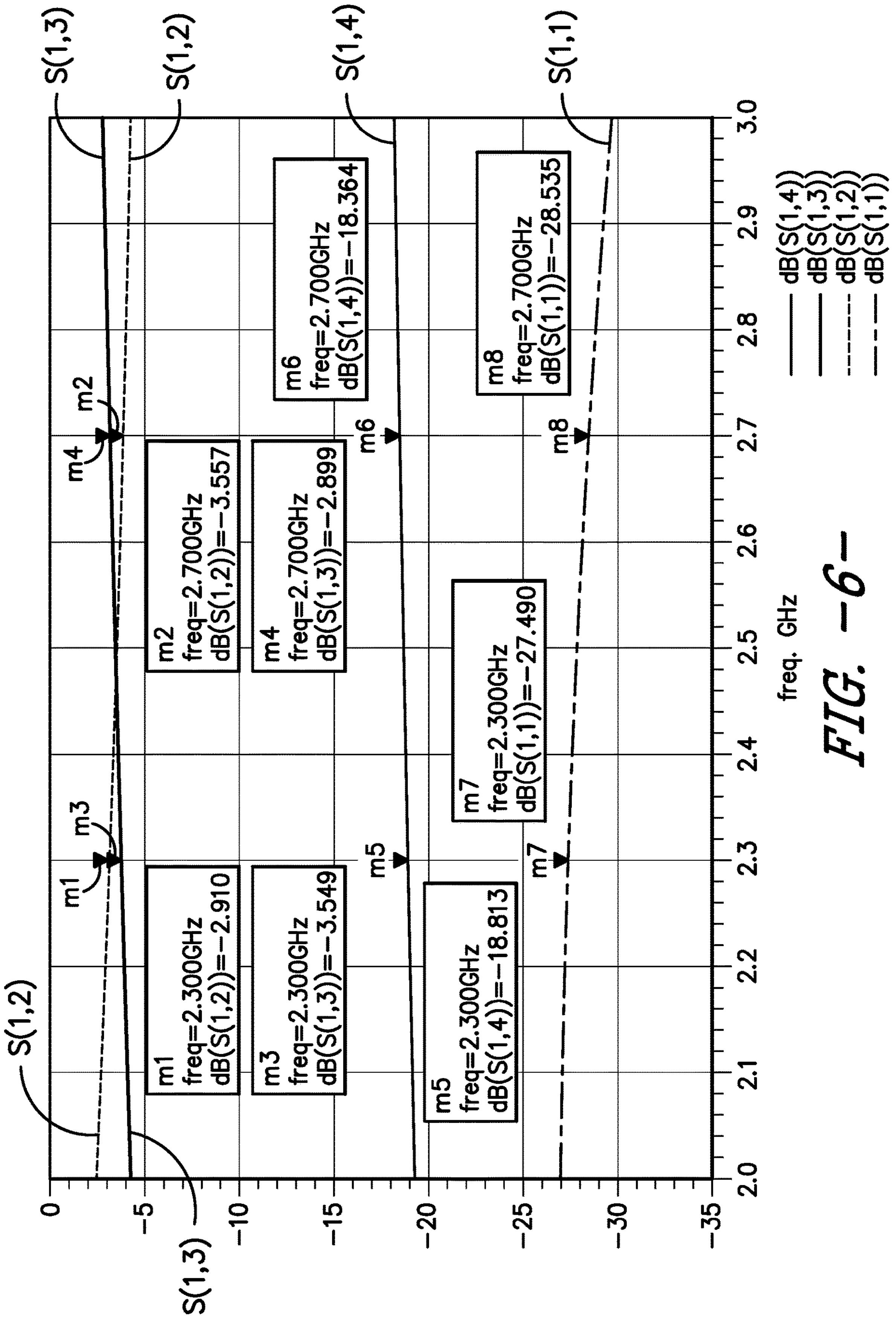
FIG. 6 is a graph of theoretically calculated S-parameters for a 3 dB coupler generally configured as the coupler of FIGS. 1 and 4C across a frequency range extending from 2 GHz to 3 GHz.

FIG. 6 represents theoretically calculated S-parameters for a first coupler generally configured as described above with reference to the coupler 200 of FIGS. 1 through 4C in accordance with aspects of the present disclosure. FIG. 6 illustrates S-parameters across a frequency range extending from 2 GHz to 3 GHz. As is understood in the art, the S-parameters are expressed with subscripts in the following form: S(a,b). The values, a and b, indicate port numbers associated with the S-parameter such that each S-parameter can understood to represent the signal resulting at port b as a result of signal input at port a. As is understood in the art, the S-parameters are commonly referenced as follows:

| S-Parameter | Name |
|---|---|
| S(1,1) | Return Loss |
| S(1,2) | Insertion Loss |
| S(1,3) | Coupling Factor |
| S(1,4) | Isolation Factor |

As shown in FIG. 6, in this example, coupling factor varies from about −4 dB at 2 GHz to about −2 dB at 3 GHz. Thus, the coupling factor varies about 2 dB across a frequency range of 2 GHz to 3 GHz. The coupling factor varies about 2 dB per GHz across the frequency range illustrated in FIG. 6.

However, a coupling frequency range can be defined from 2.3 GHz to 2.7 GHz. The following table illustrates the coupling factor at the upper and lower bounds of the coupling frequency range:

| Freq (GHz) | Coupling Factor (dB) |
|---|---|
| 2.3 | 3.549 |
| 2.7 | 2.899 |

The coupling factor can vary about 0.65 dB across the coupling frequency range. The upper bound of the coupling frequency range, 2.7 GHz, is 400 MHz greater than the lower bound of the coupling frequency range, 2.3 GHz. Thus, the coupling factor can vary about 1.63 dB per GHz across the coupling frequency range in this example.

The isolation factor is less than −18 dB across the coupling frequency range. Such a low isolation factor indicates excellent directivity. In contrast, an isolation factor of greater than −10 dB would indicate a lossy coupler.

Figure 7:
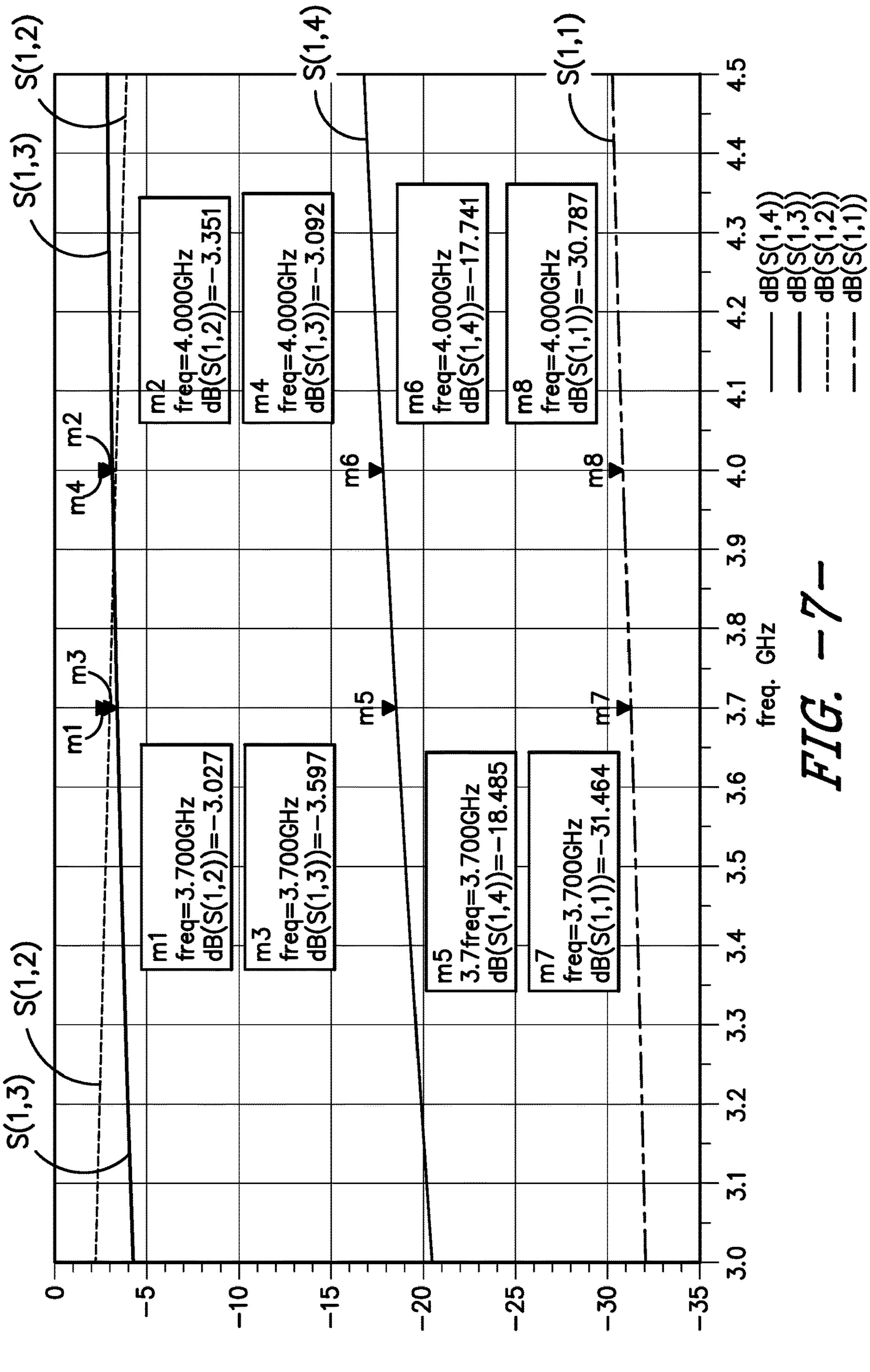
FIG. 7 is a graph of theoretically calculated S-parameters for a 3 dB coupler generally configured as the coupler of FIGS. 1 and 4C across a frequency range extending from 3 GHz to 4.5 GHz.

FIG. 7 represents theoretically calculated S-parameters for a second coupler generally configured as described above with reference to the coupler 200 of FIGS. 1 through 4C in accordance with aspects of the present disclosure. In this example, the coupling factor varies from about −4.5 dB at 3 GHz to about −2.5 dB at 4.5 GHz. Thus, the coupling factor varies about 2 dB across a frequency range of 2 GHz to 3 GHz. The coupling factor varies about 2 dB per GHz across the frequency range illustrated in FIG. 7.

However, a coupling frequency range can be defined from 3.7 GHz to 4 GHz. The following table illustrates the coupling factor at the upper and lower bounds of the coupling frequency range:

| Freq (GHz) | Coupling Factor (dB) |
|---|---|
| 3.7 | 3.397 |
| 4 | 3.092 |

The coupling factor can vary about 1.02 dB across the coupling frequency range. The upper bound of the coupling frequency range, 4 GHz, is 300 MHz greater than the lower bound of the coupling frequency range, 3.7 GHz. Thus, the coupling factor can vary about 1.02 dB per GHz across the coupling frequency range, in this example.

The isolation factor is less than −17 dB across the coupling frequency range. Such a low isolation factor indicates excellent directivity. In contrast, an isolation factor of greater than −10 dB would indicate a lossy coupler.

III. Testing

Testing for coupling factor, insertion loss, return loss, and other S-parameter characteristics may be performed using a source signal generator (e.g., a 1306 Keithley 2400 series Source Measure Unit (SMU), for example, a Keithley 2410-C SMU). For example, an input signal may be applied to the input port of the coupler, and a coupled signal may be measured at the coupling port of the coupler using the source signal generator.

IV. Applications

The disclosed coupler may be used in a variety of applications. Example applications include power amplifiers, WiFi, Worldwide Interoperability for Microwave Access (WiMAX), Wireless Broadband (WIBRO), Long Term Evolution (LTE), Bluetooth and/or Low Power Radio Gateway applications. Additional examples include power detection, frequency detection, and voltage standing wave ratio (VSWR) monitoring.

Exemplary uses include compact components configured for 5G signal processing (e.g., 5G base stations), smartphones, signal repeaters (e.g., small cells), relay stations, radar, radio frequency identification (RFID) devices. For example, power supplies can include 3 dB couplers according to the present disclosure. As described above, 3 dB couplers are also referred to as splitters/combiners. Compact 3 dB couplers having excellent performance characteristics can facilitate a less expensive power supply design. Instead of using one powerful and costly power amplifier, a pair of less powerful and less expensive power amplifiers can be employed with two 3 dB couplers, for example as described below with reference to FIG. 8.

Figure 8:
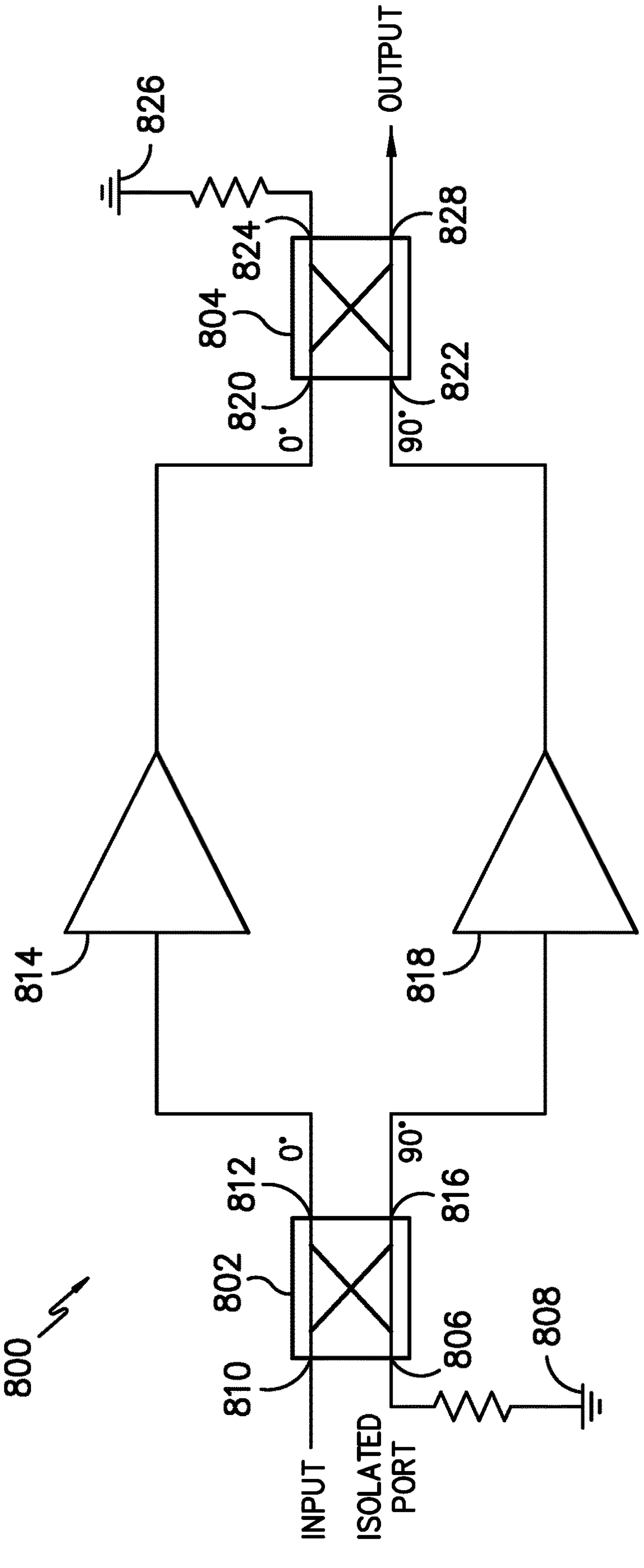
FIG. 8 illustrates a power supply including couplers according to aspects of the present disclosure.

FIG. 8 illustrates a power supply 800 including couplers according to aspects of the present disclosure. The power supply 800 includes a first coupler 802, for example as described above with respect to the coupler 200 of FIGS. 1 through 4C. An isolated port 806 of the first coupler 802 may be connected with a ground 808. An input port 810 of the first coupler 802 may correspond with an input of the power supply 800. An output port 812 of the first coupler 802 can be connected with a first amplifier 814. A coupled port 816 of the first coupler 802 can be connected with a second amplifier 818. In some embodiments, the first coupler 802 can be configured to provide a coupled signal at the coupled port 816 that is phase shifted with respect to a signal output at the output port 812. For example, the coupled signal at the coupled port 816 can be 90 degrees out of phase with output signal.

The first amplifier 814 and the second amplifier 818 may be connected with the second coupler 804. More specifically, the first amplifier 814 can be connected with a coupled port 820 of the second coupler 804. The second amplifier 818 can be connected with an input port 822 of the second coupler 804. An isolated port 824 of the second coupler 804 can be connected with a ground 826. An output port 828 of the second coupler 804 can correspond with an output of the power amplifier 800.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A surface mountable thin-film coupler comprising:
- a monolithic base substrate;
- a plurality of ports formed over the monolithic base substrate; and
- at least one thin-film component connected with at least one port of the plurality of ports;
- wherein the surface mountable thin-film coupler provides a coupling factor that is greater than −5 dB and less than −1 dB across a coupling frequency range having a lower bound that is greater than 1 GHz and an upper bound that is at least 200 MHz greater than the lower bound, and
- wherein a footprint of the coupler is less than about 3 $mm^2$.

2. The surface mountable thin-film coupler of claim 1, wherein the surface mountable thin-film coupler exhibits a coupling factor of about −3 dB across the coupling frequency range.

3. The surface mountable thin-film coupler of claim 1, wherein the surface mountable thin-film coupler exhibits a coupling factor that varies less than 5 dB across the coupling frequency range.

4. The surface mountable thin-film coupler of claim 1, wherein the surface mountable thin-film coupler exhibits a coupling factor that varies less than 3 dB per GHz across the coupling frequency range.

5. The surface mountable thin-film coupler of claim 1, wherein the surface mountable thin-film coupler exhibits an isolation factor that is less than about −10 dB across the coupling frequency range.

6. The surface mountable thin-film coupler of claim 1, wherein a width of the coupler is less than about 1.2 mm.

7. The surface mountable thin-film coupler of claim 1, wherein a length of the coupler is less than about 2 mm.

8. The surface mountable thin-film coupler of claim 1, wherein a footprint of the coupler is less than about 1.5 $mm^2$.

9. The surface mountable thin-film coupler of claim 1, wherein the at least one thin-film component comprises a layer having a thickness that is less than about 50 microns.

10. The surface mountable thin-film coupler of claim 1, wherein the at least one thin-film component of the thin-film circuit comprises a thin-film inductor.

11. The surface mountable thin-film coupler of claim 10, wherein the at least one thin-film component of the thin-film circuit comprises a thin-film capacitor.

12. The surface mountable thin-film coupler of claim 1, wherein the plurality of ports comprising an isolated port, a coupling port, an input port, and an output port, and the at least one thin-film component of the thin-film circuit comprises:
- a first thin-film inductor connected between the input port and the output port; and
- a second thin-film inductor connected between the coupling port and the isolated port and inductively coupled with the first thin-film inductor.

13. The surface mountable thin-film coupler of claim 1, wherein the plurality of ports comprising an isolated port, a coupling port, an input port, and an output port, and the at least one thin-film component of the thin-film circuit comprises:
- a first thin-film capacitor connected between the input port and the coupling port; and
- a second thin-film capacitor connected between the isolated port and the output port.

14. The surface mountable thin-film coupler of claim 1, further comprising a cover layer formed over the at least one thin-film component.

15. The surface mountable thin-film coupler of claim 14, wherein the cover layer comprises silicon oxynitride.

16. The surface mountable thin-film coupler of claim 1, wherein the at least one thin-film component of the thin-film circuit comprises a third thin-film inductor.

17. The surface mountable thin-film coupler of claim 1, wherein the monolithic base substrate comprises a ceramic material.

18. A surface mountable thin-film coupler comprising:

a monolithic base substrate;

a plurality of ports formed over the monolithic base substrate, wherein the plurality of ports comprising an isolated port, a coupling port, an input port, and an output port;

a first thin-film inductor connected between the input port and the output port; and a second thin-film inductor connected between the coupling port and the isolated port and inductively coupled with the first thin-film inductor wherein a footprint of the coupler is less than about 3 $mm^2$.

19. The surface mountable thin-film coupler of claim 18, wherein the surface mountable thin-film coupler exhibits an isolation factor that is less than about −10 dB across the coupling frequency range.

20. The surface mountable thin-film coupler of claim 18, wherein the surface mountable thin-film coupler exhibits a coupling factor between −1 dB and −5 dB over a coupling frequency range.

21. The surface mountable thin-film coupler of claim 18, wherein the surface mountable thin-film coupler exhibits a coupling factor that varies less than 5 dB over a coupling frequency range.

22. The surface mountable thin-film coupler of claim 18, wherein the surface mountable thin-film coupler exhibits a coupling factor that varies less than 3 dB per GHz over the coupling frequency range.

23. The surface mountable thin-film coupler of claim 18, wherein at least one of the first thin-film inductor or the second thin-film inductor comprises a layer having a thickness that is less than about 50 microns.

24. The surface mountable thin-film coupler of claim 18, further comprising at least one thin-film capacitor connected with at least one of the input ports or the isolated port.

25. The surface mountable thin-film coupler of claim 18, further comprising:

a first thin-film capacitor connected between the input port and the coupling port; and a second thin-film capacitor connected between the isolated port and the output port.

26. The surface mountable thin-film coupler of claim 18, further comprising a cover layer formed over the first thin-film inductor and the second thin-film inductor.

27. The surface mountable thin-film coupler of claim 26, wherein the cover layer comprises silicon oxynitride.

28. The surface mountable thin-film coupler of claim 18, wherein a width of the coupler is less than about 1.2 mm.

29. The surface mountable thin-film coupler of claim 18, wherein a length of the coupler is less than about 2 mm.

30. The surface mountable thin-film coupler of claim 18, wherein the monolithic base substrate comprises a ceramic material.

31. A method for forming a surface mountable thin-film coupler, the method comprising:

providing a monolithic base substrate;

forming a plurality of ports over the monolithic base substrate, wherein the plurality of ports comprising an isolated port, a coupling port, an input port, and an output port;

forming a first thin-film inductor connected between the input port and the output port; and forming a second thin-film inductor connected between the coupling port and the isolated port and inductively coupled with the first thin-film inductor, wherein a footprint of the coupler is less than about 3 $mm^2$.

32. A power supply comprising:

at least one amplifier; and at least one surface mountable thin-film coupler comprising:

a monolithic base substrate;

a plurality of ports formed over the monolithic base substrate; and at least one thin-film component connected with at least one port of the plurality of ports;

wherein the surface mountable thin-film coupler provides a coupling factor that is greater than −5 dB and less than −1 dB across a coupling frequency range having a lower bound that is greater than 1 GHz and an upper bound that is at least 200 MHz greater than the lower bound, and wherein a footprint of the coupler is less than about 3 $mm^2$.

* * * * *